(12) United States Patent
Brudniok

(10) Patent No.: US 11,292,139 B2
(45) Date of Patent: Apr. 5, 2022

(54) GRIPPER HAVING A SENSOR ON A TRANSMISSION MEMBER BEARING OF THE GRIPPER

(71) Applicant: KUKA Deutschland GmbH, Augsburg (DE)

(72) Inventor: Sven Brudniok, Langerringen (DE)

(73) Assignee: KUKA Deutschland GmbH, Augsburg (DE)

( * ) Notice: Subject to any disclaimer, the term of this patent is extended or adjusted under 35 U.S.C. 154(b) by 181 days.

(21) Appl. No.: 16/624,602

(22) PCT Filed: Jun. 15, 2018

(86) PCT No.: PCT/EP2018/065920
§ 371 (c)(1),
(2) Date: Dec. 19, 2019

(87) PCT Pub. No.: WO2018/234170
PCT Pub. Date: Dec. 27, 2018

(65) Prior Publication Data
US 2020/0306994 A1 Oct. 1, 2020

(30) Foreign Application Priority Data

Jun. 19, 2017 (DE) ...................... 10 2017 210 213.6

(51) Int. Cl.
*B25J 15/02* (2006.01)
*B25J 13/08* (2006.01)
(Continued)

(52) U.S. Cl.
CPC ........... *B25J 15/026* (2013.01); *B25J 13/082* (2013.01); *F16C 17/10* (2013.01); *F16H 25/20* (2013.01);
(Continued)

(58) Field of Classification Search
CPC .. F16C 2326/00; F16C 17/10; F16H 25/2021; B25J 13/082; B25J 15/026
See application file for complete search history.

(56) References Cited

U.S. PATENT DOCUMENTS 4,579,380 A * 4/1986 Zaremsky .............. B25J 13/082
294/119.1
4,598,942 A * 7/1986 Shum ..................... B25J 15/103
294/106

(Continued)

FOREIGN PATENT DOCUMENTS

DE       20100104 U1     4/2001
DE    102014010014 A1    1/2016
(Continued)

OTHER PUBLICATIONS

European Patent Office; Search Report in related International Patent Application No. PCT/EP2018/065920 dated Oct. 24, 2018; 4 pages.

(Continued)

*Primary Examiner* — David M Fenstermacher
(74) *Attorney, Agent, or Firm* — Dorton & Willis, LLP

(57) ABSTRACT

A gripper includes at least one first gripper finger adjustably mounted to a gripper main body by a gripping finger mount, at least one second gripper finger cooperating with the first gripper finger, and a motor-drivable transmission configured to adjust the at least one first gripper finger relative to the gripper main body and the at least one second gripper finger such that a clamping force is generated, whereby an article can be held in a clamped manner by the gripper. The transmission includes a first transmission member connected to the first gripper finger, and a second transmission member mounted on the gripper main body by a transmission-member bearing arrangement having a first transmission member bearing configured to absorb the transmission- (Continued)

bearing reaction force that acts in a direction of the clamping force. The transmission-member bearing arrangement includes a sensor configured to sense the transmission-bearing reaction force.

19 Claims, 7 Drawing Sheets

(51) Int. Cl.
    *F16C 17/10*     (2006.01)
    *F16H 25/20*     (2006.01)

(52) U.S. Cl.
    CPC ...... *F16H 25/2021* (2013.01); *F16C 2326/00* (2013.01)

(56) References Cited

U.S. PATENT DOCUMENTS

| | | | |
|---|---|---|---|
| 4,600,357 A | 7/1986 | Coules | |
| 4,653,793 A * | 3/1987 | Guinot | B25J 13/082 |
| | | | 294/106 |
| 4,699,414 A * | 10/1987 | Jones | B25J 15/026 |
| | | | 294/119.1 |
| 5,012,591 A | 5/1991 | Asakawa | |
| 9,156,171 B2 | 10/2015 | Hecht et al. | |
| 11,110,592 B2 * | 9/2021 | Shimomura | B25J 9/161 |
| 2001/0028175 A1 * | 10/2001 | Thompson | B25J 15/026 |
| | | | 294/119.1 |
| 2010/0156127 A1 * | 6/2010 | De Kervanoael | B25J 15/0253 |
| | | | 294/106 |
| 2010/0165096 A1 | 7/2010 | Tassakos et al. | |
| 2014/0028118 A1 | 1/2014 | Sakano | |
| 2014/0156066 A1 * | 6/2014 | Sakano | B25J 9/1633 |
| | | | 700/245 |
| 2014/0180477 A1 * | 6/2014 | Chung | B25J 13/082 |
| | | | 700/258 |
| 2017/0151679 A1 * | 6/2017 | Wong | B25J 13/082 |
| 2019/0030732 A1 * | 1/2019 | Kondoh | G01L 5/226 |
| 2019/0176326 A1 * | 6/2019 | Bingham | B25J 9/161 |
| 2020/0070356 A1 * | 3/2020 | Baptist | B25J 13/084 |
| 2020/0139558 A1 * | 5/2020 | Vu | B25J 19/063 |
| 2020/0306994 A1 * | 10/2020 | Brudniok | F16H 25/2021 |
| 2021/0101292 A1 * | 4/2021 | Kuppuswamy | B25J 13/082 |
| 2021/0138662 A1 * | 5/2021 | Tsukui | B25J 13/082 |

FOREIGN PATENT DOCUMENTS

| | | |
|---|---|---|
| EP | 0237336 A2 | 9/1987 |
| EP | 2660015 B1 | 3/2015 |
| WO | 2008083995 A1 | 7/2008 |

OTHER PUBLICATIONS

German Patent Office; Examination Report in related German Patent Application No. 10 2017 210 213.6 dated Feb. 22, 2018; 6 pages.

* cited by examiner

GRIPPER HAVING A SENSOR ON A
TRANSMISSION MEMBER BEARING OF
THE GRIPPER

CROSS-REFERENCE TO RELATED
APPLICATIONS

This application is a national phase application under 35 U.S.C. § 371 of International Patent Application No. PCT/EP2018/065920, filed Jun. 15, 2018 (pending), which claims the benefit of priority to German Patent Application No. DE 10 2017 210 213.6, filed Jun. 19, 2017, the disclosures of which are incorporated by reference herein in their entirety.

TECHNICAL FIELD

The invention relates to a gripper, comprising a gripper body, at least one first gripper finger that is mounted so as to be adjustable relative to the gripper body by means of a gripping finger bearing, and at least one second gripper finger that interacts with the first gripper finger, as well as a transmission that can be driven by a motor and that is designed to adjust the at least one first gripper finger, mounted so as to be adjustable by means of the gripping finger bearing, relative to the gripper body and relative to the at least one second gripper finger, such that the movement of the first gripper finger can bring about a clamping force by means of which an object can be held in a clamped manner by the gripper.

BACKGROUND

WO 2008/083995 A1 discloses a device for quality control of a rotationally symmetrical body, the device comprising a manipulation system comprising a gripper for gripping the body and for transporting the body into a working position, as well as at least one electronic camera for optically sensing the body in the working position, the gripper of the manipulation system comprising gripping fingers having rotationally symmetrical retaining elements for holding the body, the retaining elements being designed so as to be rotatable about the axes of rotation thereof. In this case, the retaining elements of the gripping fingers of the gripper are in each case connected to a gearwheel for conjoint rotation, the gearwheels of all gripping fingers of the gripper being indirectly engaged in a central gearwheel of the gripper, via at least one further gearwheel, and the gripper comprising a drive mechanism that sets the central gearwheel into a rotational movement.

EP 2 660 015 B1 discloses a gripper for manipulating in particular tubular specimen cups, comprising a gripper base, at least two gripper fingers that each comprise a retaining portion for grasping a specimen cup and are in each case arranged on the gripper base so as to be rotatable, relative to the gripper base, about a finger axis of rotation, the retaining portions of the gripper fingers in each case being arranged so as to be acentric with respect to the associated finger axis of rotation, and comprising a first drive for rotating the gripper fingers, the gripper fingers being coupled to one another such that they are driven, by the drive, simultaneously and having the same rotational speed and direction in each case, the gripper base being arranged on a main body and so as to be rotatable relative thereto, about a base axis of rotation that is different from the finger axes of rotation, and that a second drive is provided for rotating the gripper base relative to the main body, and that a control means is provided for controlling the drives such that a substantially linear movement relative to the main body results in each case, for each of the retaining portions of the gripper fingers, from a movement combination of rotation of the gripper fingers relative to the gripper base, and rotation of the gripper base relative to the main body.

SUMMARY

The object of the invention is that of providing a gripper comprising an integrated sensor, which detects the clamping force of the gripper outside of the gripper finger. According to the object, the sensor should thus be arranged separately, i.e. in a manner separated from, the gripper fingers, and still be able to precisely detect the clamping force of the gripper.

This object is achieved according to the invention by a gripper, comprising a gripper body, at least one first gripper finger that is mounted so as to be adjustable relative to the gripper body by means of a gripping finger bearing, and at least one second gripper finger that interacts with the first gripper finger, as well as a transmission that can be driven by a motor and that is designed to adjust the at least one first gripper finger, mounted so as to be adjustable by means of the gripping finger bearing, relative to the gripper body and relative to the at least one second gripper finger, such that the movement of the first gripper finger can bring about a clamping force by means of which an object can be held in a clamped manner by the gripper, the transmission comprising a first transmission link that is connected to the first gripper finger, and comprising a second transmission link that is mounted on the gripper body, specifically by means of a transmission link bearing assembly that is separate from the gripping finger bearing and that comprises a first transmission link bearing that is designed to separately absorb only the transmission bearing reaction force acting in the orientation of the clamping force, the transmission link bearing assembly being associated with a sensor that is designed to detect the transmission bearing reaction force.

Owing to the adjustability, described in more detail above, of the at least one first gripper finger relative to the at least one second gripper finger, the movement of the first gripper finger can generate a clamping force, and specifically preferably owing to a drive force that is linked to the movement or is related to the movement, which force can be generated for example by a motor of the gripper.

The sensor according to the invention can measure the clamping force that acts between the first gripper finger and the second gripper finger, irrespective of where the gripper fingers touch the gripped object, and irrespective of the shape and length of the gripper fingers. Accordingly, in very general terms, the sensor according to the invention detects a physical property in the bearing, which allows for the magnitude of the bearing reaction force to be concluded, which force, according to the principle of cause and effect, corresponds in this respect to the clamping force.

In a specific embodiment, the transmission comprises a first transmission link that is connected to the first gripper finger, and comprises a second transmission link that is mounted on the gripper body, specifically by means of a transmission link bearing assembly that is separate from the gripping finger bearing and that comprises a first transmission link bearing that is designed to separately absorb only the transmission bearing reaction force acting in the orientation of the clamping force, the first transmission link bearing being associated with a sensor that is designed to detect the transmission bearing reaction force.

In this respect, the gripper body forms a carrier or a housing on which the gripper fingers of the gripper are movably mounted or rigidly fastened, depending on the embodiment. Adjustable mounting of the at least one first gripper finger, which, in this respect, forms a gripper jaw of the gripper, can be achieved by means of a pivot bearing and/or linear bearing; at least two gripper fingers are required, at least one of which is movably mounted. In the case of a gripper comprising two gripper fingers, for example a first gripper finger may be adjustably mounted such that it can be moved towards a second gripper finger, which is rigidly fastened to the gripper body, in order to close the two gripper fingers, and can be moved away therefrom in order to open the two gripper fingers. An object can then be held in a clamped manner between the two gripper fingers. In an alternative embodiment, both or all of the gripper fingers can be mounted so as to be adjustable. Thus, in the case of a gripper of this kind, for example two gripper fingers may be provided, each individual gripper finger of which is mounted so as to be adjustable, individually, in each case. The two gripper fingers can then be moved towards one another or away from one another.

The at least one first gripper finger or the at least two gripper fingers is/are accordingly mounted on the gripper so as to be adjustable relative to the gripper body, by means of the gripper finger bearing. The respective drive of the correspondingly movable gripper finger is achieved separately form the gripper finger bearing, by a transmission of the gripper.

The transmission may comprise two or more transmission elements, i.e. gearwheels, racks, pulleys, coupling bars, or other transmission elements corresponding to the transmission type, which elements engage in one another in order to form the transmission function, and thus from transmission links. Each transmission link can be mounted, with respect to the gripper body, by means of a common or an individual transmission link bearing, according to the function of said link in the transmission.

As a result of the transmission comprising a first transmission link that is connected to the first gripper finger, and comprising a second transmission link that is mounted on the gripper body, specifically by means of a transmission link bearing assembly that is separate from the gripping finger bearing and that comprises a first transmission link bearing that is designed to separately absorb only the transmission bearing reaction force acting in the orientation of the clamping force, the first transmission link bearing being associated with a sensor that is designed to detect the transmission bearing reaction force, a gripper comprising an integrated sensor is provided, which detects the clamping force of the gripper outside of the gripping fingers. The sensor is accordingly arranged separately, i.e. in a manner separated from, the gripper fingers, and can still precisely detect the clamping force of the gripper.

In order to ensure reliable gripping of an object by means of a gripper of a robot, e.g. a two-jaw gripper, it should be ensured that the gripping force, i.e. a clamping force, is maintained even in the event of an interruption of the energy supply of the gripper. For this purpose, in particular two methods have been used hitherto.

One method provides a brake on the drive side on the gripper servomotor of the gripper, which brake is closed in the currentless state. The result of this solution is that the gripper can maintain the gripping force, during operation, only by means of an energy supply. The gripping force, i.e. the clamping force, can be concluded from measuring the respective current strengths. However, a disadvantage of this solution is the additionally required brake on the motor and the constant energization of the motor in order to maintain the clamping force, since this results in an increased energy consumption and can also lead to a heat problem.

The second method contains one or more system elements in the drive train, in the drive train between the motor and the gripper finger, at the output, which elements are not reversible. The result of this is that the gripper fingers cannot be released by external forces following a power loss, and that the gripper does not have to be energized in order to maintain the gripping force during operation. A force measurement via a current measurement only delivers a result relating to the closing force when closing the jaws on the gripped object, but not relating to the clamping force during operation, if for example the gripper, together with the gripped object, is moved by the robot, since feedback relating to the gripping force is not returned from the gripping jaws to the motor, owing to the self-locking of the drive train. Furthermore, the gripping force when closing the jaws is dependent not only on the current with which the motor is operated, but rather also on the momentum with which the jaws are closed.

For a force measurement, in grippers of this kind a measurement in the gripper fingers is preferred, which fingers undergo deformation owing to the clamping force. As a result, all forces and torques that are applied to the finger are conducted to the finger base, via the sensor, and all loads that do not correspond to the clamping force to be measured can influence the measurement result, as interfering forces and interfering torques. This type of force measurement is furthermore dependent on the location of the force absorption, since for example the interfering torques can vary significantly between the point of contact of the finger with the gripped object, and the measurement point, owing to the variable lever arm. Therefore, a measuring principle is preferred in which the sensor is decoupled from all interfering forces and torques, and therefore detects only the force to be measured, and is thus independent of for example the length of the fingers, and thus the lever arm.

A measurement in the drive train is associated with significant effort, since the drive elements thereof move, and this has to be compensated, for example by the bridging electrical connections.

A simple drive train is therefore proposed, which is not reversible and in which the gripping force can be maintained without an additional brake. In this case, a force measurement by means of the current can only provide information on the force during closing, if the closing speed and the moved mass are known, but not on the clamping force if the drive motor is decoupled by the self-retention. The force measurement should not be influenced by the non-reversible property of the drive train. If the gripper is one in which the gripper jaws are driven in a linear manner, the force measurement should not be influenced by the location at which the jaws touch the gripped object. If the gripper is one in which the gripper jaws are driven in a rotatable manner, the measurement of the clamping torque should not be influenced by the location at which the jaws touch the gripped object. Furthermore, the measurement point should as far as possible not move, in order to simplify electrical contacting.

In order for the force measurement to be independent of the self-locking of the drive train, it is proposed that the force measurement should be performed at a part of the drive train that is located in the drive train on the parts by which the segments of the drive train that bring about the self-locking are supported on the main body in order to apply the reaction force, which corresponds to the clamping force.

A force measurement in the fingers of the gripper is ruled out because it is dependent on the location at which the force is applied, and because the fingers move, and this would have to be bridged by an electrical connection that would then be necessary.

A force measurement by measuring the deformation of the moved drive train is ruled out because the drive train moves for example rotatably, and this movement would have to be bridged by the electrical connection.

As a measurement location it is therefore proposed, according to the invention, to perform the measurement at a point at which the drive train is supported in the housing. In order for this to be possible, the conduction of the drive force may not proceed such that the clamping forces of the mutually opposing gripper fingers compensate one another, and thus do not require any support as a counterforce. The drive train on which the measurement is performed therefore drives an individual gripper finger. If more than one gripper finger is driven, a plurality of drive trains are to be provided, which may, however, optionally also be driven by a common motor. It is also possible for only one gripper finger to be driven and for the counterforce to be applied by a stationary gripper finger.

According to the invention, the driven gripper jaw, i.e. the driven gripper finger, can be mounted via a guide, such that the gripper finger is supported against the rotational movement of the drive. The transverse torques on the gripper finger, which result from the lever arm to the clamping force, are absorbed by the bearing or guide, such that they do not influence the drive torque. The linear movement of the gripper jaw can for example be transmitted from a spindle to a nut which is arranged in a rigid manner with respect to the gripper jaw. The drive torque is transmitted to the spindle as a pure torque, without a portion of an axial force. For the torque transfer to the spindle, it is possible to use for example spur gears or a toothed belt. The spindle can for example be mounted in the gripper housing, by means of two radial bearings, so as to be axially freely movable. Axial support of the spindle can be achieved by an axial bearing that is connected to the housing by a cantilever. Applying a drive torque results in a linear displacement of the gripper jaw. If said jaw touches an object, a clamping force with respect to said object is generated, owing to the drive torque. This clamping force is braced by the spindle and the axial bearing, on the cantilever, which presses the axial bearing against the shaft at the counterforce, i.e. the bearing reaction force, which is the same magnitude as the clamping force. Deformation of the cantilever can be identified for example by means of strain gauges attached thereto. The drive train can be designed such that it is not reversible. This can be achieved by means of the pitch of the spindle and the static friction in the spindle-nut connection, and also by the frictional force of the entire drive, which is applied to the spindle. The axial support of the spindle absorbs the clamping force, irrespective of whether or not the drive train is jammed.

In this manner, a gripper can be constructed, in which the movable gripper finger is supported by means of a linear guide.

Furthermore, the gripper can be designed such that two mutually opposing gripper finger jaws or gripper fingers are displaced relative to one another, each gripper finger being driven by a separate drive train. The clamping force can be measured separately on the two drive trains.

The gripping finger bearing can be designed to absorb all forces, acting on the first gripper finger, that are different from the clamping force, and all torques that arise at the first gripper finger. The gripping finger bearing can in particular be designed to absorb all forces, acting on the first gripper finger, that are different from the clamping force, and all torques that arise at the first gripper finger, and specifically in combination with a part of the transmission bearing assembly that separately absorbs or can separately absorb all transmission bearing reaction forces that are different from those in the orientation of the clamping force.

In general, i.e. in the underlying embodiment of the gripper, the gripping surfaces are designed so as to be planar, and are oriented such that the clamping force is introduced into the relevant gripper finger perpendicularly or at least approximately perpendicularly to the gripping surface. In this case, the gripper finger that is movable in each case is mounted so as to be movable, relative to the gripper body, in the orientation of the clamping force. A bearing that is movable in the orientation of the clamping force means that the gripper finger is adjustable counter to the clamping force direction, in order to close the gripper so as to grasp objects, and is adjustable in the clamping force direction, in order to open the gripper so as to release objects.

Owing to the clamping force in the object gripped by the gripper, in this process torque can be induced, in particular owing to the longitudinal extension of the gripper finger, which torques are absorbed by the gripping finger bearing. However, it is also possible, for example, for transverse forces, i.e. forces oriented perpendicularly to the orientation of the clamping force, to arise, which forces are likewise absorbed by the gripping finger bearing.

The transmission link bearing assembly can comprise a second transmission link bearing that is separate from the first transmission link bearing and that is designed to absorb all transmission bearing forces that are different from the transmission bearing reaction force acting in the orientation of the clamping force. The transmission should allow for a movement of the associated gripper finger in the orientation of the clamping force. However, this also means that the transmission must brace all other potential mobilities of the gripper finger, in particular insofar as these are not absorbed by the gripping finger bearing. In this respect, the transmission link bearing assembly can also be designed to absorb torques induced as a result of the longitudinal extension of the gripper finger, and/or transverse forces, i.e. forces that are oriented perpendicularly to the orientation of the clamping force.

The first transmission link bearing can be connected to the gripper body by means of a bending portion that extends perpendicularly to the orientation of the clamping force, at least in part or entirely, and in this case the bending portion can comprise a sensor which is furthermore designed to indirectly detect the transmission bearing reaction force by detecting sagging of the bending portion caused by the clamping force.

The bending portion can be formed by a separate strut that connects the first transmission link bearing to the gripper body. Alternatively, the bending portion can be formed integrally with the transmission link bearing and/or in particular also integrally with the gripper body.

The transmission may comprise a spindle drive which comprises a spindle nut as a first transmission link, which is connected to the first gripper finger, and comprises a spindle shaft as a second transmission link, which is mounted on the gripper body, on which spindle shaft the spindle nut runs in the longitudinal extension of the shaft.

The spindle shaft can be arranged having the shaft longitudinal extension thereof in parallel with the orientation of the clamping force that is to be measured, such that the clamping force of the first gripper finger is diverted into the gripper body, via the spindle nut and via the spindle shaft, in the axial direction of the spindle shaft, by means of the first transmission link bearing.

The first transmission link bearing can be designed as a purely axial bearing.

The second transmission link bearing can be designed to mount the spindle shaft in the gripper body so as to be axially adjustable. The fact that the second transmission link bearing is designed to mount the spindle shaft in the gripper body so as to be axially movable makes it possible to ensure that all the axial forces arising completely pass through the first transmission link bearing, and are captured only there.

The gripper can comprise one single first gripper finger that is driven in a motorized manner by means of the transmission, and in this case the at least one second gripper finger can be arranged so as to be rigid with respect to the gripper body. In this case, the gripper is opened and/or closed exclusively by means of a movement of the first gripper finger, which finger can be moved towards the rigid second gripper finger in order to close the gripper, and/or can be moved away from the rigid second gripper finger in order to open the gripper.

The gripper can comprise two separate first gripper fingers that are driven in a motorized manner, independently of one another, by means of one individual transmission in each case, and in the process the other gripper finger, respectively, with respect to the first gripper finger in each case, forms the second gripper finger. Thus, in this case, the two gripper fingers, i.e. both the first gripper finger and the second gripper finger, are mounted on the gripper body so as to be movable independently of one another. In this case, the two gripper fingers can in particular perform symmetrical or synchronous movements, such that the two gripper fingers are either moved uniformly towards one another in order to close the gripper or are moved uniformly away from one another in order to open the gripper. However, in this case each gripper finger is mounted and driven by an individual gripper finger bearing and an individual transmission. The two transmissions can, however, electively be driven by a common motor or by two separate motors.

The transmission can be designed as a self-retaining or at least self-locking transmission, such that, in a state of the transmission without a drive force, the movement of the transmission is blocked, despite clamping force existing at the first gripper finger.

The transmission can be designed as a self-retaining or at least self-locking transmission, and in this case the sensor can be arranged on a transmission link bearing that is arranged in the transmission force flow between the gripper body and a transmission link pair that brings about the self-retention or self-locking of the transmission.

In the context of the invention, self-locking means that a movement of the at least one gripper finger is hampered. Self-retention means that a movement of at least one gripper finger can no longer take place at all, in view of the arising forces. If, for example, the drive train of the gripper cannot be reversed, i.e. the gripper fingers cannot open automatically when a drive force is lost, this can be referred to as self-retention. It may, however, optionally already be sufficient for a movement of the at least one gripper finger to merely be significantly hampered, and in this respect the transmission is not entirely self-retaining, but at least self-locking. Depending on fringe conditions, such as an ambient temperature or arising clamping forces or clamping torques, self-locking may then transition into self-retention. In this respect, the self-retention can be considered an extreme form of the self-locking.

In a first variant, the sensor can comprise at least one strain gauge which is designed to detect the transmission bearing reaction force acting in the orientation of the clamping force, in the form of surface elongations or surface compressions on the first transmission link bearing, in particular on the bending portion of the first transmission link bearing.

In a second variant, the sensor can comprise at least one distance sensor which is designed to detect a distance between the second transmission link bearing and the first transmission link bearing, in particular a bending portion of the first transmission link bearing. The distance sensor can be an optical sensor for example. In this case, the optical sensor can for example comprise a light transmitter and an associated light receiver, one of the light transmitter and light receiver, respectively, being arranged on the second transmission link bearing, and the other of the light transmitter and light receiver, respectively, being arranged on the first transmission link bearing. The first transmission link bearing, in particular the bending portion of the first transmission link bearing, can also be designed as a reflection surface, both the light transmitter and the light receiver being arranged on the second transmission link bearing.

In a third variant, the sensor can comprise at least one distance sensor which is designed to detect a distance between the gripper body and an axial end face of the second transmission link, in particular an axial end face of a spindle shaft of the gripper. In this variant, too, the distance sensor can be an optical sensor for example. In this case, the optical sensor can for example comprise a light transmitter and an associated light receiver, one of the light transmitter and light receiver, respectively, being arranged on the axial end face of the second transmission link, and the other of the light transmitter and light receiver, respectively, being arranged on the gripper body. The axial end face of the second transmission link can also be designed as a reflection surface, both the light transmitter and the light receiver being arranged on the gripper body.

A specific embodiment of the invention is explained in greater detail in the following description, with reference to the accompanying figures. Irrespective of the specific context in which they are mentioned, specific features of this embodiment that is given by way of example can represent general features of the invention, optionally also considered individually or in further combinations.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
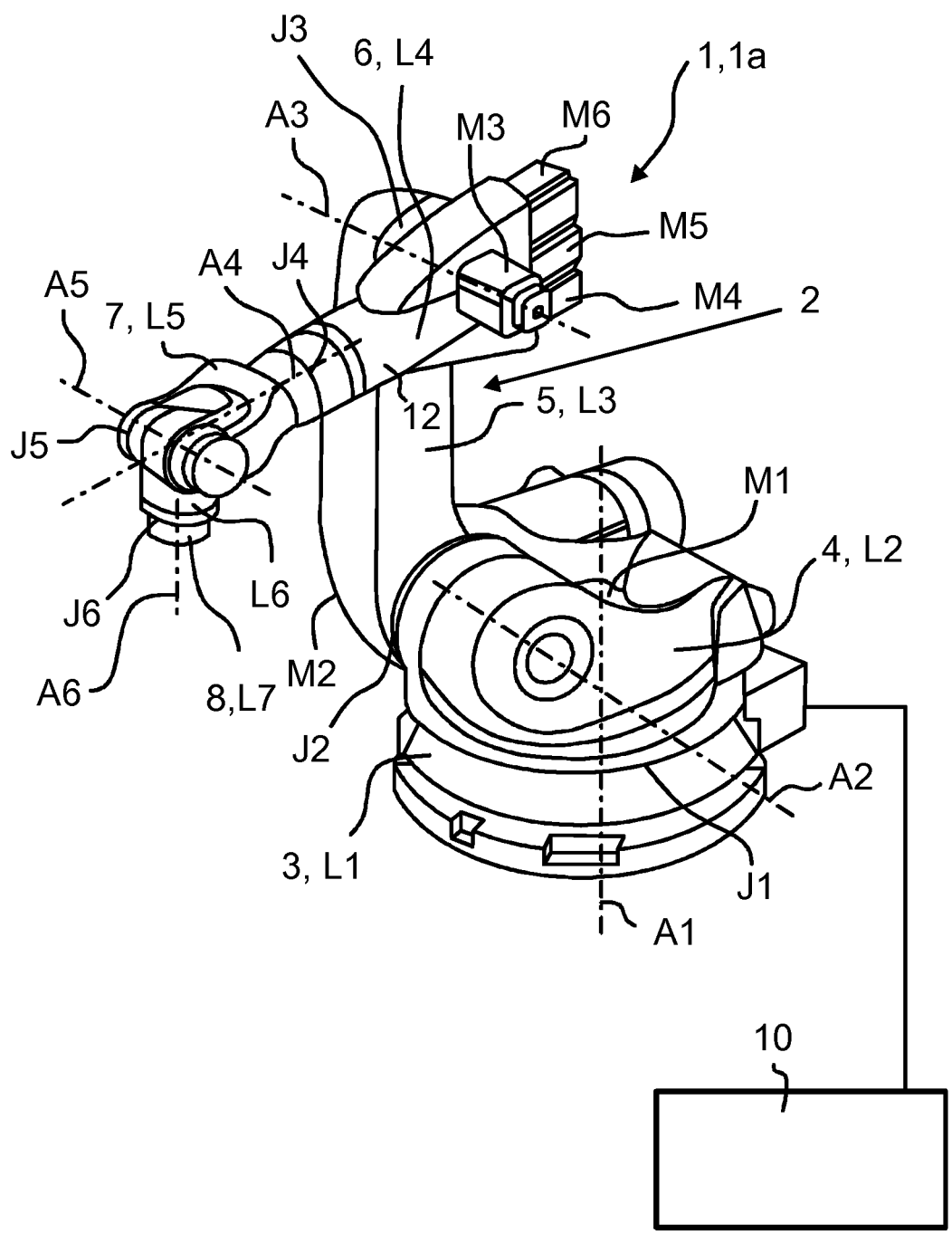
FIG. 1 is a perspective view of an industrial robot in the manner of a six-axis buckling arm robot which can comprise a gripper according to the invention on the hand flange thereof.

FIG. 1 shows a robot 1 that comprises a robot arm 2 and a robot control 10. In the case of the present embodiment, the robot arm 2 comprises a plurality of links L1 to L7 that are rotatably interconnected by means of joints J1 to J6.

The robot control 10 of the robot 1 is designed or configured to execute a robot program, by means of which the joints J1 to J6 of the robot arm 2 can be adjusted or rotated in an automated manner, in accordance with the robot program, or automatically in manual operation. For this purpose, the robot control 10 is connected to controllable electric motors M1 to M6 which are designed to adjust the joints J1 to J6 of the robot 1.

In the case of the present embodiment of an industrial robot 1a, the links L1 to L7 are a frame 3 and a carrousel 4 that is mounted so as to be rotatable, relative to the frame 3, about a vertically extending axis A1. Further links of the robot arm 2 are a link arm 5, a boom arm 6 and a preferably multiaxial robot hand 7 comprising a fastening device, designed as a tool flange 8, for fastening a robot gripper 11 according to the invention. The link arm 5 is arranged on the carrousel 4 at the lower end, i.e. on the joint J2 of the link arm 5 that can also be denoted the link arm bearing head, so as to be pivotable about a preferably horizontal axis of rotation A2.

At the upper end of the link arm 5, the boom arm 6 is in turn mounted on the first joint J3 of the link arm 5, so as to be pivotable about a likewise preferably horizontal axis A3. Said boom arm supports the robot hand 7 at the end thereof, said hand preferably having three axes of rotation A4, A5, A6. The joints J1 to J6 can be driven in a program-controlled manner by the robot control 10, via one of the electric motors M1 to M6 in each case. In general, for this purpose a transmission can be provided between each of the links L1 to L7 and the electric motor M1 to M6 that is associated in each case.

Figure 2:
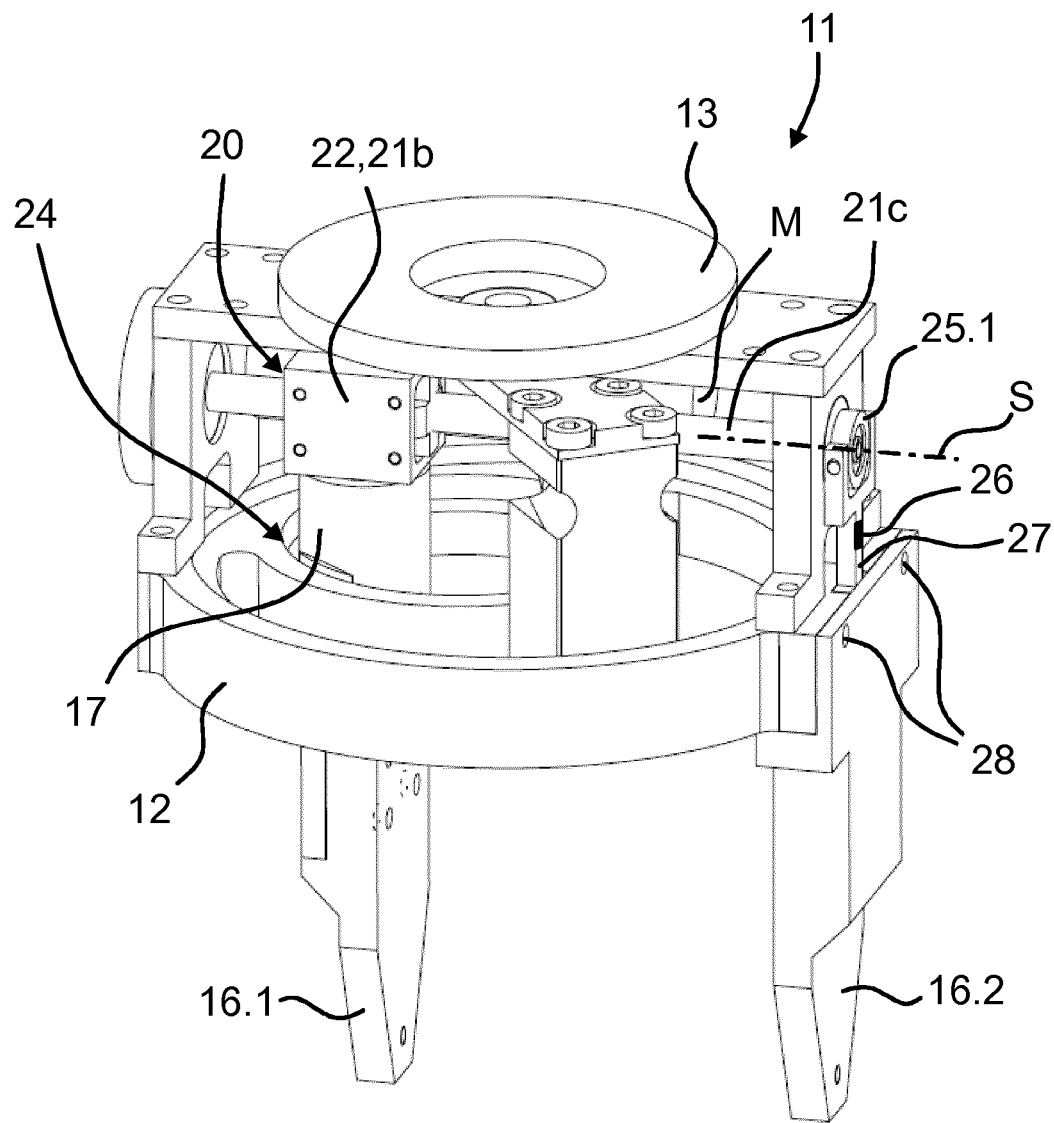
FIG. 2 is a perspective view of a gripper, given by way of example, in the open position thereof.
Figure 3:
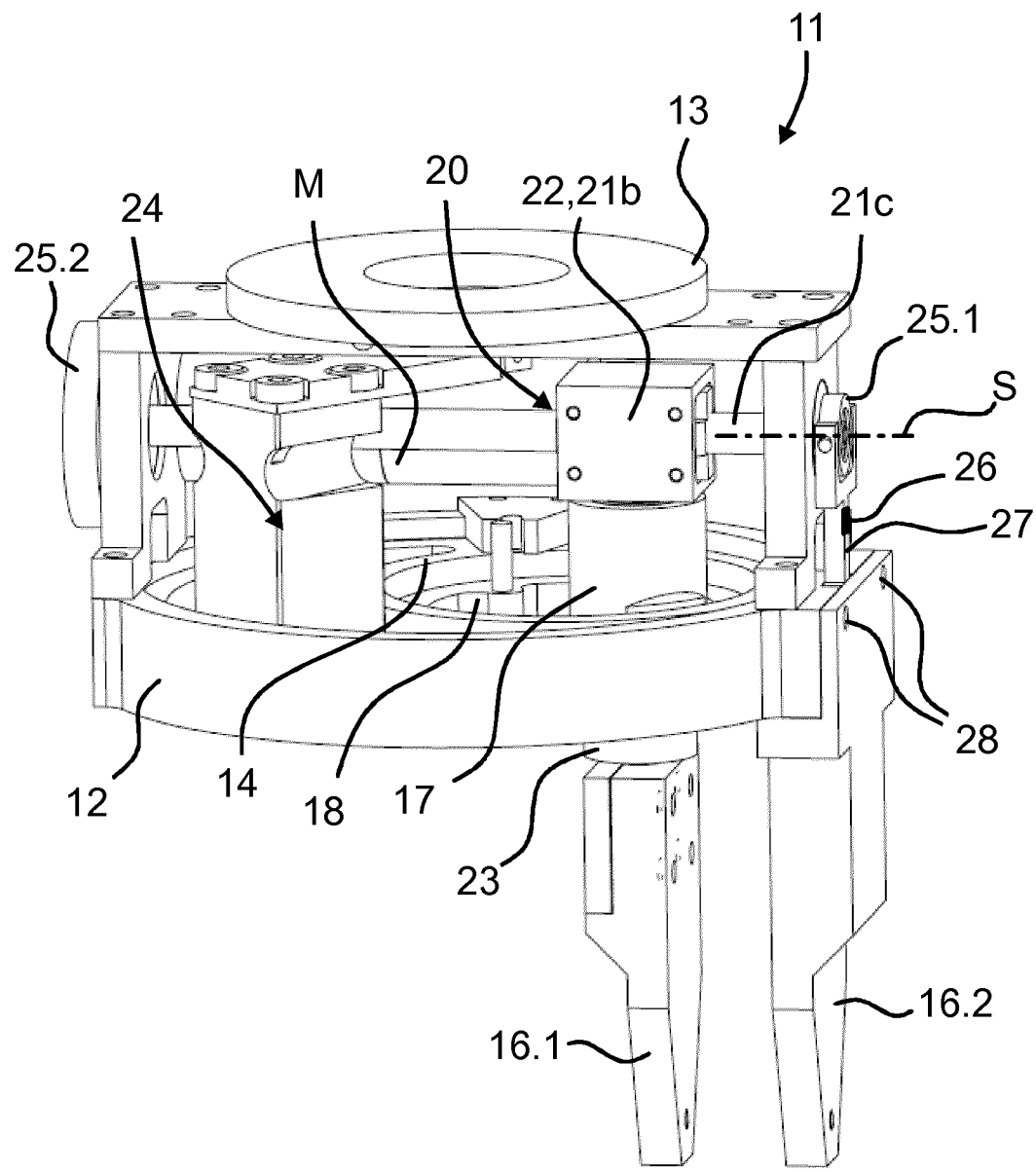
FIG. 3 is a perspective view of a gripper, given by way of example, in the closed position thereof.

FIG. 2 and FIG. 3 show an embodiment, by way of example, of a robot gripper 11 according to the invention, which gripper comprises a first gripper finger 16.1 and a second gripper finger 16.2. The robot gripper 11 comprises a gripper body 12, a base link 14 which is mounted so as to be rotatable relative to the gripper body 12, and an intermediate link 18 which is mounted so as to be rotatable relative to the base link 14. The robot gripper 11 further comprises a finger support 17 that supports the first gripper finger 16.1 and that is mounted so as to be rotatable relative to the intermediate link 18. The robot gripper 11 comprises a connecting flange 13 that is designed for fastening the robot gripper 11 on the tool flange 8 of the robot arm 2.

The robot gripper 11 comprises the first gripper finger 16.1 and the second gripper finger 16.2, as well as the gripper body 12 and the base link 14. The base link 14 is mounted about a first axis of rotation, so as to be rotatable with respect to the gripper body 12, by means of a first revolute joint. The intermediate link 18 is mounted, by means of a second revolute joint, so as to be rotatable relative to the base link 14, and specifically about a second axis of rotation that is oriented so as to be in parallel with the first axis of rotation and is arranged so as to be at a constant first distance from the first axis of rotation. The finger support 17, which supports the first gripper finger 16.1, is mounted, by means of a third revolute joint, so as to be rotatable relative to the intermediate link 18, and specifically about a third axis of rotation that is oriented so as to be in parallel with the first axis of rotation and with the second axis of rotation, and is arranged so as to be at a constant second distance from the second axis of rotation.

In this embodiment, the links of the robot gripper 11 which are formed by the gripper body 12, the base link 14, the intermediate link 18 and the finger support 17 form a kinematic chain of links that can be rotatably displaced by means of the first revolute joint, the second revolute joint and the third revolute joint. In this case, the three axes of rotation of the first revolute joint, the second revolute joint and the third revolute joint are oriented so as to be in parallel with one another. As a result, it is thus possible for the first gripper finger 16.1, mounted on the finger support 17, to be moved on a trajectory towards the stationary second gripper finger 16.2 or can be moved away therefrom, in the plane of the second end face of the gripper body 12.

As can be seen in FIG. 2 and FIG. 3, the robot gripper 11 according to the invention comprises a drive means 20 that is separate from the first revolute joint, the second revolute joint and the third revolute joint, which drive means is supported against the gripper body 12 and is designed to adjust the finger support 17 relative to the second gripper finger 16.2 by means of a drive force that is introduced into the finger support 17 by the drive means 20. In the case of the embodiment shown, the second gripper finger 16.2 is arranged so as to be stationary relative to the gripper body 12.

In the embodiment shown, the drive means 20 comprises a motor M and a drive spindle, i.e. spindle shaft 21c, that is mounted on the gripper body 12 so as to be rotatable about a spindle axis S and is rotatably driven by the motor M. A drive spindle nut 22, 21b is mounted on the drive spindle or the spindle shaft 21c so as to be linearly adjustable along the spindle axis S. The drive spindle nut 22, 21b is coupled to the finger support 17 for moving the finger support 17 by driving the motor M. The finger support 17 is connected to the drive spindle nut 22, 21b by means of a rod 23.

Figure 4:
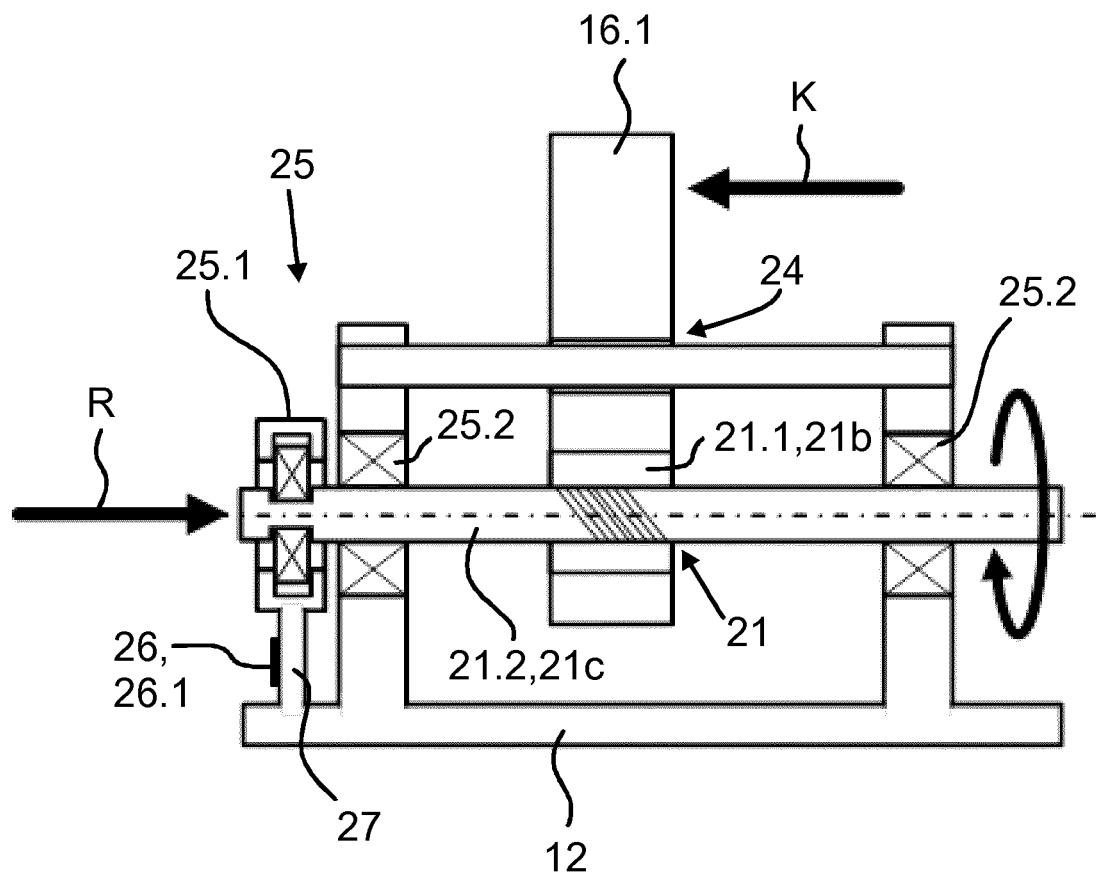
FIG. 4 is a schematic view of a gripper finger bearing according to the invention comprising a first variant of a sensor on a first transmission link bearing of the gripper.
Figure 5:
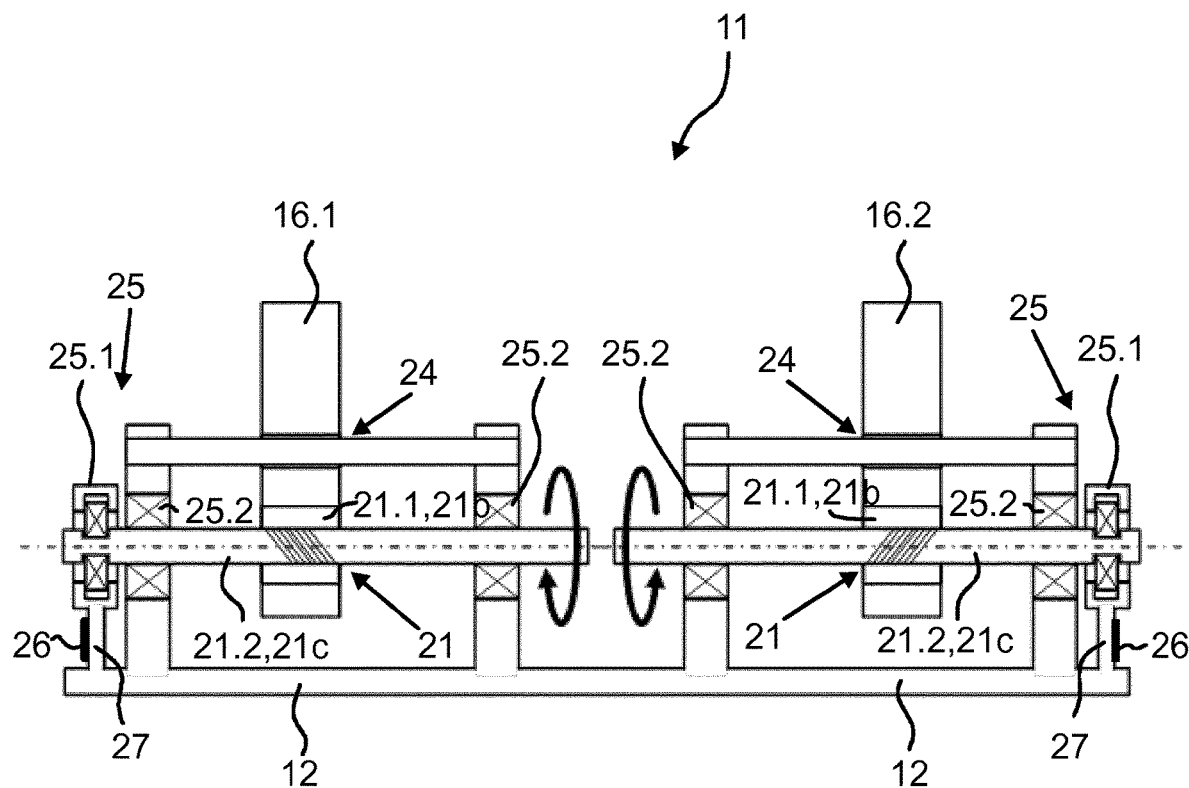
FIG. 5 is a schematic view of a pair of gripper finger bearings according to the invention, which are each provided with an individual sensor on a separate transmission link bearing.

With reference now to the generalized schematic drawings of FIG. 4 and FIG. 5, according thereto the gripper 11 comprises a gripper body 12, at least one first gripper finger 16.1 that is mounted so as to be adjustable relative to the gripper body 12 by means of a gripping finger bearing 24, and at least one second gripper finger 16.2 that interacts with the first gripper finger 16.1, as well as a transmission 21 that can be driven by a motor and that is designed to adjust the at least one first gripper finger 16.1, mounted so as to be adjustable by means of the gripping finger bearing 24, relative to the gripper body 12 and relative to the at least one second gripper finger 16.2, such that the movement of the first gripper finger 16.1 and the drive force acting on the gripping finger can bring about a clamping force K by means of which an object can be held in a clamped manner by the gripper 11, the transmission 21 comprising a first transmission link 21.1 that is connected to the first gripper finger 16.1, and comprising a second transmission link 21.2 that is mounted on the gripper body 12, specifically by means of a transmission link bearing assembly 25 that is separate from the gripping finger bearing 24 and that comprises a first transmission link bearing 25.1 that is designed to separately absorb only the transmission bearing reaction force R acting in the orientation of the clamping force K, said first transmission link bearing 25.1 being associated with a sensor 26 that is designed to detect the transmission bearing reaction force R.

The gripping finger bearing 24 is designed to absorb all forces, acting on the first gripping finger 16.1, that are different from the clamping force K, and all torques that arise at the first gripper finger 16.1

In the case of the present embodiment, the transmission link bearing assembly 25 comprises a second transmission link bearing 25.2 that is separate from the first transmission link bearing 25.1 and that is designed to absorb all transmission bearing forces that are different from the transmission bearing reaction force R acting in the orientation of the clamping force K.

The first transmission link bearing 25.1 is connected to the gripper body 12 by means of a bending portion 27 that extends perpendicularly to the orientation of the clamping force K, at least in part or entirely, and in this case the bending portion 27 comprises a sensor 26 which is furthermore designed to indirectly detect the transmission bearing reaction force R by detecting sagging of the bending portion 27 caused by the clamping force K.

In the case of the present embodiment, the transmission 21 comprises a spindle drive 21a which comprises a spindle nut 21b as a first transmission link 21.1, which is connected to the first gripper finger 16.1, and comprises a spindle shaft 21c as a second transmission link 21.2, which is mounted on the gripper body 12, on which spindle shaft the spindle nut 21b runs in the longitudinal extension of the shaft.

The spindle shaft 21c is arranged having the shaft longitudinal extension thereof in parallel with the orientation of the clamping force K, such that the clamping force K of the first gripper finger 16.1 is diverted into the gripper body 12, via the spindle nut 21b and via the spindle shaft 21c, in the axial direction of the spindle shaft 21c, by means of the first transmission link bearing 25.1.

In the case of the present embodiment, the first transmission link bearing 25.1 is designed as a purely axial bearing.

The second transmission link bearing 25.2 is designed to mount the spindle shaft 21c on the gripper body 12 so as to be axially adjustable.

In the case of the embodiment of FIG. 4, the gripper 11 comprises a single first gripper finger 16.1 that is driven by the transmission 21 and the motor M. In this case, as is can be seen in FIG. 2, the at least one second gripper finger 16.2 is arranged so as to be rigid with respect to the gripper body 12, and specifically by means of a screw connection 28.

In the case of the embodiment of FIG. 5, the gripper 11 comprises two separate gripper fingers 16.1 and 16.2 that are driven in a motorized manner, independently of one another, by means of one individual transmission 21 in each case. In this embodiment, the gripper 11 comprises a first transmission 21 that can be driven by a motor and that is designed to adjust the at least one first gripper finger 16.1, mounted so as to be adjustable by means of the gripping finger bearing 24, relative to the gripper body 12 and relative to the at least one second gripper finger 16.2, such that the movement of the first gripper finger 16.1 can bring about a clamping force K by means of which an object can be held in a clamped manner by the gripper 11, the transmission 21 comprising a first transmission link 21.1 that is connected to the first gripper finger 16.1, and comprising a second transmission link 21.2 that is mounted on the gripper body 12, specifically by means of a transmission link bearing assembly 25 that is separate from the gripping finger bearing 24 and that comprises a first transmission link bearing 25.1 that is designed to separately absorb only the transmission bearing reaction force R acting in the orientation of the clamping force K, said first transmission link bearing 25.1 being associated with a sensor 26 that is designed to detect the transmission bearing reaction force R. In this embodiment, however, the gripper 11 accordingly also comprises a second transmission 21 that can be driven by a motor and that is designed to adjust the at least one second gripper finger 16.2, mounted so as to be adjustable by means of the gripping finger bearing 24, relative to the gripper body 12 and relative to the at least one first gripper finger 16.1, such that the movement of the second gripper finger 16.2 can bring about a clamping force K by means of which an object can be held in a clamped manner by the gripper 11, the second transmission 21 comprising a first transmission link 21.1 that is connected to the second gripper finger 16.2, and comprising a second transmission link 21.2 that is mounted on the gripper body 12, specifically by means of a transmission link bearing assembly 25 that is separate from the gripping finger bearing 24 and that comprises a first transmission link bearing 25.1 that is designed to separately absorb only the transmission bearing reaction force R acting in the orientation of the clamping force K, said first transmission link bearing 25.1 being associated with a further sensor 26 that is designed to detect the transmission bearing reaction force R.

The transmission 21 can be designed as a self-retaining or self-locking transmission 21, such that, in a state of the transmission 21 without a drive force, the movement of the transmission 21 is blocked, despite clamping force existing at the first gripper finger 16.1.

The transmission 21 can in particular be designed as a self-locking or self-retaining transmission 21, the sensor 26 being arranged on a transmission link bearing 25.1 that is arranged in the transmission force flow between the gripper body 12 and a transmission link pair (spindle nut 21b and spindle shaft 21c) that brings about the self-locking of the transmission 21.

The sensor 26 can in general comprise at least one strain gauge which is designed to detect the transmission bearing reaction force R in the orientation of the clamping force K, in the form of surface elongations or surface compressions on the first transmission link bearing 25.1, in particular on the bending portion 27 of the first transmission link bearing 25.1.

Figure 6:
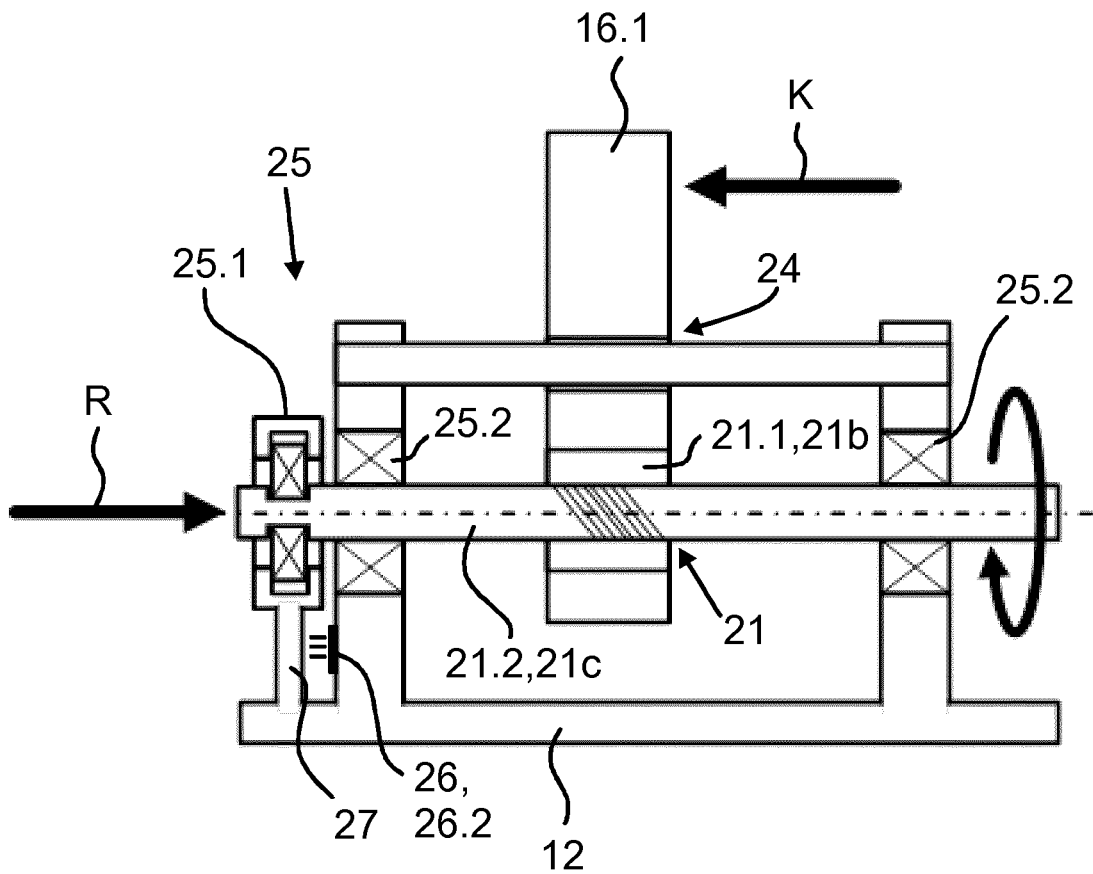
FIG. 6 is a schematic view of a gripper finger bearing according to the invention comprising a second variant of a sensor between the second transmission link bearing and the first transmission link bearing.

FIG. 6 schematically shows a gripper finger bearing in a second variant, in which the sensor 26 comprises at least one distance sensor 26.2 which is designed to record a distance between the second transmission link bearing 25.2 and the first transmission link bearing 25.1, in particular the bending portion 27 of the first transmission link bearing 25.1.

Figure 7:
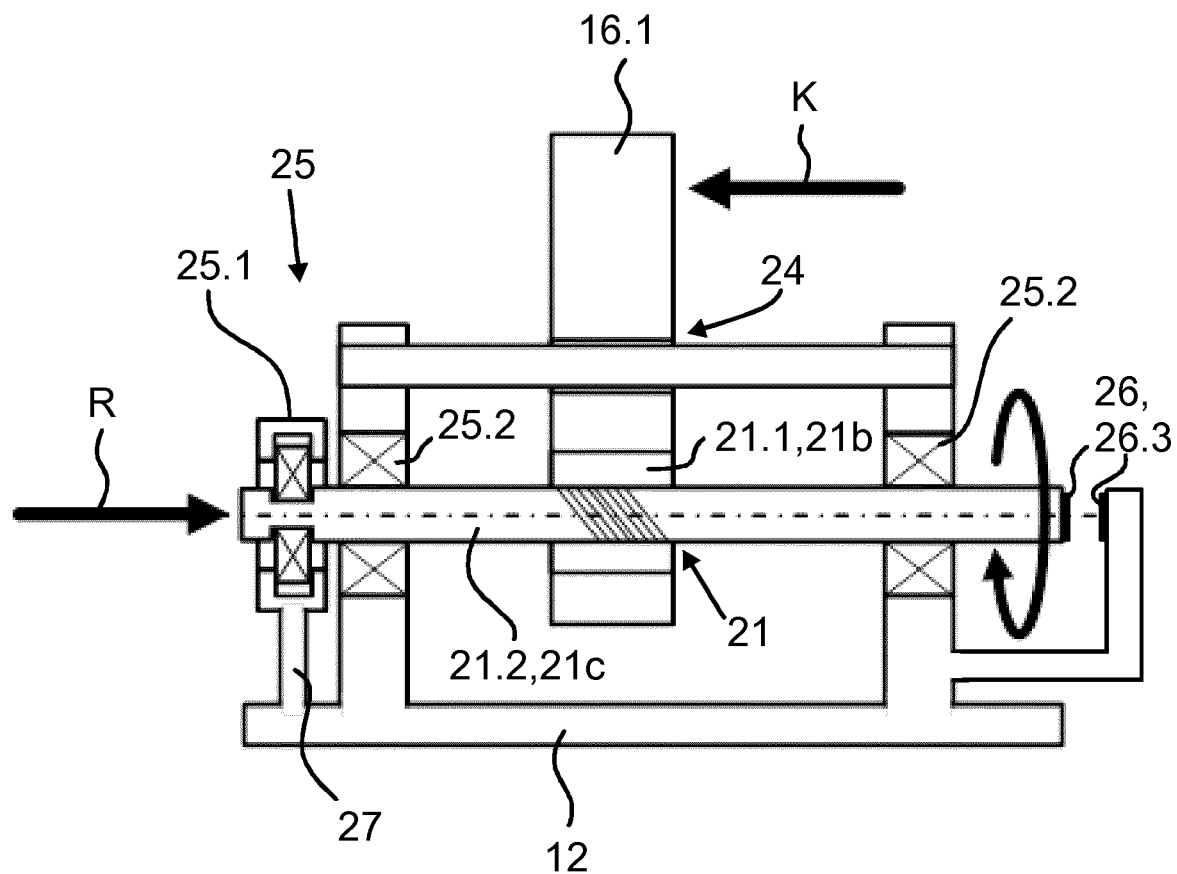
FIG. 7 is a schematic view of a gripper finger bearing according to the invention comprising a third variant of a sensor between the gripper body and an axial end face of the second transmission link.

FIG. 7 schematically shows a gripper finger bearing in a third variant, in which the sensor 26 comprises at least one distance sensor 26.3 which is designed to detect a distance between the gripper body 12 and an axial end face of the second transmission link 21.2, in particular an axial end fact of a spindle shaft 21c of the gripper 11.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A gripper, comprising:
   a gripper body;
   at least one first gripper finger mounted so as to be adjustable relative to the gripper body by a gripping finger bearing;
   at least one second gripper finger that interacts with the first gripper finger;
   a motor-driven transmission configured to adjust the at least one first gripper finger relative to the gripper body and relative to the at least one second gripper finger, such that movement of the first gripper finger can bring about a clamping force whereby an object can be held in a clamped manner by the gripper;
   the transmission comprising:
      a first transmission link connected to the first gripper finger, and
      a second transmission link mounted on the gripper body by a transmission link bearing assembly that is separate from the gripping finger bearing and that comprises a first transmission link bearing that is configured to separately absorb only a transmission bearing reaction force acting in a direction aligned with the clamping force; and
   a sensor associated with the transmission link bearing assembly and configured to detect the transmission bearing reaction force.

2. The gripper of claim 1, wherein the transmission link bearing assembly further comprises a second transmission link bearing that is separate from the first transmission link bearing and that is configured to absorb all transmission bearing forces that are different from the transmission bearing reaction force acting in the direction aligned with the clamping force.

3. The gripper of claim 1, wherein the gripping finger bearing is configured to absorb all forces acting on the first gripper finger that are different from the clamping force, and to absorb all torques that arise at the first gripper finger.

4. The gripper of claim 3, wherein the gripping finger bearing, in order to absorb all forces acting on the first gripper finger, cooperates with a part of the transmission bearing assembly that separately absorbs all transmission bearing reaction forces that are different from those aligned with the direction of the clamping force.

5. The gripper of claim 1, wherein:
   the first transmission link bearing is connected to the gripper body by a bending portion that extends perpendicularly to the direction of the clamping force, at least in part or entirely; and
   the bending portion comprises a sensor configured to indirectly detect the transmission bearing reaction force by detecting a sagging of the bending portion caused by the clamping force.

6. The gripper of claim 1, wherein the transmission includes a spindle drive, the spindle drive comprising:
   a first transmission link in the form of a spindle nut, the spindle nut connected to the first gripper finger; and
   a second transmission link in the form of a spindle shaft, the spindle shaft mounted on the gripper body;
   wherein the spindle nut runs on the spindle shaft in a longitudinal direction of the spindle shaft.

7. The gripper of claim 6, wherein the spindle shaft is arranged such that a longitudinal extent of the spindle shaft is parallel with the direction of the clamping force, such that the clamping force of the first gripper finger is diverted into the gripper body via the spindle nut and via the spindle shaft, in an axial direction of the spindle shaft, by the first transmission link bearing.

8. The gripper of claim 7, wherein the first transmission link bearing is configured as a purely axial bearing.

9. The gripper of claim 6, wherein:
   the transmission link bearing assembly further comprises a second transmission link bearing that is separate from the first transmission link bearing and that is configured to absorb all transmission bearing forces that are different from the transmission bearing reaction force acting in the direction aligned with the clamping force; and
   the second transmission link bearing is configured to mount the spindle shaft on the gripper body so as to be axially adjustable relative to the gripper body.

10. The gripper of claim 1, comprising:
    a single first gripper finger driven in a motorized manner by the transmission; and
    the at least one second gripper finger is configured to be rigid with respect to the gripper body.

11. The gripper of claim 1, further comprising:
    a second motor-driven transmission configured to adjust the at least one second gripper finger relative to the gripper body and relative to the at least one first gripper finger, whereby the first and second gripper fingers are both driven in a motorized manner, independently of one another.

12. The gripper of claim 1, wherein the transmission is configured as a self-retaining or at least self-locking transmission such that, in a state of the transmission without a drive force, movement of the transmission is blocked despite a clamping force existing at the first gripper finger.

13. The gripper of claim 12, wherein the sensor is arranged on a transmission link bearing that is disposed in the transmission force flow between the gripper body and the first and second transmission links in order to bring about the self-retention or the self-locking of the transmission.

14. The gripper of claim 1, wherein the sensor comprises at least one strain gauge configured to detect the transmission bearing reaction force acting in the orientation of the clamping force in the form of surface elongations or surface compressions on the first transmission link bearing.

15. The gripper of claim 14, wherein the sensor is configured to detect the surface elongations or surface compressions on a bending portion that extends perpendicularly to the direction of the clamping force and connects the first transmission link bearing to the gripper body.

16. The gripper of claim 1, wherein the sensor comprises at least one distance sensor configured to detect a distance between the second transmission link bearing and the first transmission link bearing.

17. The gripper of claim 16, wherein the at least one distance sensor is configured to detect a distance between the second transmission link bearing and a bending portion of the first transmission link bearing.

18. The gripper of claim 1, wherein the sensor comprises at least one distance sensor configured to detect a distance between the gripper body and an axial end face of the second transmission link.

19. The gripper of claim 18, wherein the at least one distance sensor is configured to detect a distance between the gripper body and an axial end face of a spindle shaft of the gripper.

* * * * *